United States Patent
Ryu et al.

(10) Patent No.: US 9,202,523 B2
(45) Date of Patent: Dec. 1, 2015

(54) METHOD AND APPARATUS FOR PROVIDING INFORMATION RELATED TO BROADCAST PROGRAMS

(75) Inventors: Won-Ho Ryu, Suwon-si (KR); Hee-Seon Park, Seoul (KR); Il-Hwan Choi, Yongin-si (KR); Yoon-Hee Choi, Suwon-si (KR); Chang-Hwan Choi, Seoul (KR); Sang-Wook Kang, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 651 days.

(21) Appl. No.: 13/260,285

(22) PCT Filed: Apr. 7, 2010

(86) PCT No.: PCT/KR2010/002144
§ 371 (c)(1),
(2), (4) Date: Sep. 24, 2011

(87) PCT Pub. No.: WO2010/117213
PCT Pub. Date: Oct. 14, 2010

(65) Prior Publication Data
US 2012/0017239 A1  Jan. 19, 2012

(30) Foreign Application Priority Data
Apr. 10, 2009 (KR) .......... 10-2009-0031471
Mar. 3, 2010 (KR) .......... 10-2010-0019153

(51) Int. Cl.
*H04N 7/025* (2006.01)
*H04N 5/445* (2011.01)
(Continued)

(52) U.S. Cl.
CPC .......... *G11B 27/28* (2013.01); *G06F 17/30796* (2013.01); *G06F 17/30855* (2013.01);
(Continued)

(58) Field of Classification Search
CPC ............... H04N 21/47205; H04N 21/4725; H04N 21/4782; H04N 21/8405; H04N 21/8586; H04N 21/4722; H04N 21/4316
USPC ........................... 725/32, 34, 40, 53
See application file for complete search history.

(56) References Cited

U.S. PATENT DOCUMENTS 5,905,981 A  5/1999 Lawler
8,037,496 B1  10/2011 Begeja et al.
(Continued)

FOREIGN PATENT DOCUMENTS

EP  1016991 A2  7/2000
EP  1079387 A2  2/2001
(Continued)

OTHER PUBLICATIONS

Communication from the European Patent Office issued Jun. 28, 2013 in counterpart European Application No. 10761874.6.
(Continued)

*Primary Examiner* — Benjamin R Bruckart
*Assistant Examiner* — Carmine Malangone
(74) *Attorney, Agent, or Firm* — Sughrue Mion, PLLC

(57) ABSTRACT

A method and apparatus for providing information related to broadcast programs are provided. According to an example, objects are detected from broadcast scenes and keywords. Each of the objects include an object name and information regarding the meaning of the object, are generated. Then, scene sections are set based on the keywords and related information is searched for each scene section. The related information identified by the search is synchronized with the corresponding scene section and then provided to a user.

17 Claims, 8 Drawing Sheets

(51) Int. Cl.
*G11B 27/28* (2006.01)
*H04N 21/4722* (2011.01)
*H04N 21/431* (2011.01)
*G06Q 30/00* (2012.01)
*G11B 27/34* (2006.01)
*H04N 5/14* (2006.01)
*H04N 21/44* (2011.01)
*H04N 21/81* (2011.01)
*H04N 21/8405* (2011.01)
*G11B 27/11* (2006.01)
*G06F 17/30* (2006.01)

(52) U.S. Cl.
CPC .............. *G06Q30/00* (2013.01); *G11B 27/11* (2013.01); *G11B 27/34* (2013.01); *H04N 5/147* (2013.01); *H04N 21/4316* (2013.01); *H04N 21/44008* (2013.01); *H04N 21/4722* (2013.01); *H04N 21/8133* (2013.01); *H04N 21/8405* (2013.01)

(56) References Cited

U.S. PATENT DOCUMENTS

| | | | |
|---|---|---|---|
| 2001/0001160 A1* | 5/2001 | Shoff et al. | 725/51 |
| 2005/0044112 A1 | 2/2005 | Yamamoto et al. | |
| 2006/0059120 A1 | 3/2006 | Xiong et al. | |
| 2007/0274596 A1 | 11/2007 | Murata et al. | |
| 2008/0066107 A1 | 3/2008 | Moonka et al. | |
| 2008/0172696 A1* | 7/2008 | Furusawa et al. | 725/46 |
| 2008/0193101 A1* | 8/2008 | Agnihotri et al. | 386/52 |
| 2008/0212932 A1 | 9/2008 | Lee et al. | |
| 2008/0215577 A1 | 9/2008 | Takagi | |
| 2009/0199098 A1 | 8/2009 | Kweon et al. | |
| 2010/0125875 A1* | 5/2010 | Hays et al. | 725/61 |
| 2010/0229078 A1 | 9/2010 | Otsubo et al. | |
| 2012/0030713 A1* | 2/2012 | Begeja et al. | 725/53 |

FOREIGN PATENT DOCUMENTS

| | | |
|---|---|---|
| EP | 1089560 A1 | 4/2001 |
| EP | 1684517 A2 | 7/2006 |
| JP | 2004-102494 A | 4/2004 |
| JP | 2005-327205 A | 11/2005 |
| JP | 2008-227909 A | 9/2008 |
| JP | 2009-059335 A | 3/2009 |
| WO | 2007/086233 A1 | 8/2007 |
| WO | 2009/044818 A1 | 4/2009 |

OTHER PUBLICATIONS

International Search Report [PCT/ISA210], dated Nov. 15, 2010, issued in Application No. PCT/KR2010/002144 from the International Searching Authority.

Written Opinion [PCT/ISA/237], dated Nov. 15, 2010, issued in Application No. PCT/KR2010/002144 from the International Searching Authority.

Communication from the Japanese Patent Office dated Dec. 10, 2013, in a counterpart Japanese application No. 2012-504615.

* cited by examiner

FIG. 5

| RELATED INFORMATION (501) | SCENE SECTION(502) | | |
|---|---|---|---|
| | SECTION 1 | SECTION 2 | ... |
| A($^{A1,\ A2}_{A3,\ ...}$) | 0 | | |
| B | 0 | | |
| C | 0 | | |
| D | 0 | | |
| E | 0 | | |
| F | 0 | 0 | |
| G | | 0 | |
| H | | 0 | |
| I | | 0 | |
| J | | 0 | |

METHOD AND APPARATUS FOR PROVIDING INFORMATION RELATED TO BROADCAST PROGRAMS

CROSS REFERENCE TO RELATED APPLICATION

This application is a National Stage of International Application No. PCT/KR2010/002144, filed Apr. 7, 2010, which claims priority from Korean Patent Application No. 10-2009-0031471 filed on Apr. 10, 2009 and Korean Patent Application No. 10-2010-0019153 filed on Mar. 3, 2010, the contents of all of which are incorporated herein by reference in their entirety.

TECHNICAL FIELD

The following description relates to a technique of using web searching for providing related information to a user who is watching television.

BACKGROUND

With the recent introduction of Internet or web supported TV services, various services have been developed in order to promote the convenience of users. An example of such TV is Internet Protocol Television (IPTV).

Since broadcasting signals for IPTV are able to contain various kinds of additional information, users can obtain various kinds of information through IPTV, including scheduled times of broadcasting programs, captions, etc.

Furthermore, IPTV allows users to search for desired information through a network connected thereto. For example, when there is an animal documentary online, users can search for information relating to the animals by manipulating the IPTV or a set-top box connected thereto.

However, conventional methods of searching for information in digital TV, etc., are inconvenient to use since they require direct manipulation by a user.

BRIEF DESCRIPTION OF THE DRAWINGS

FIG. 5 illustrates an example of a mapping relationship between scene sections and related information.

Figure 1:
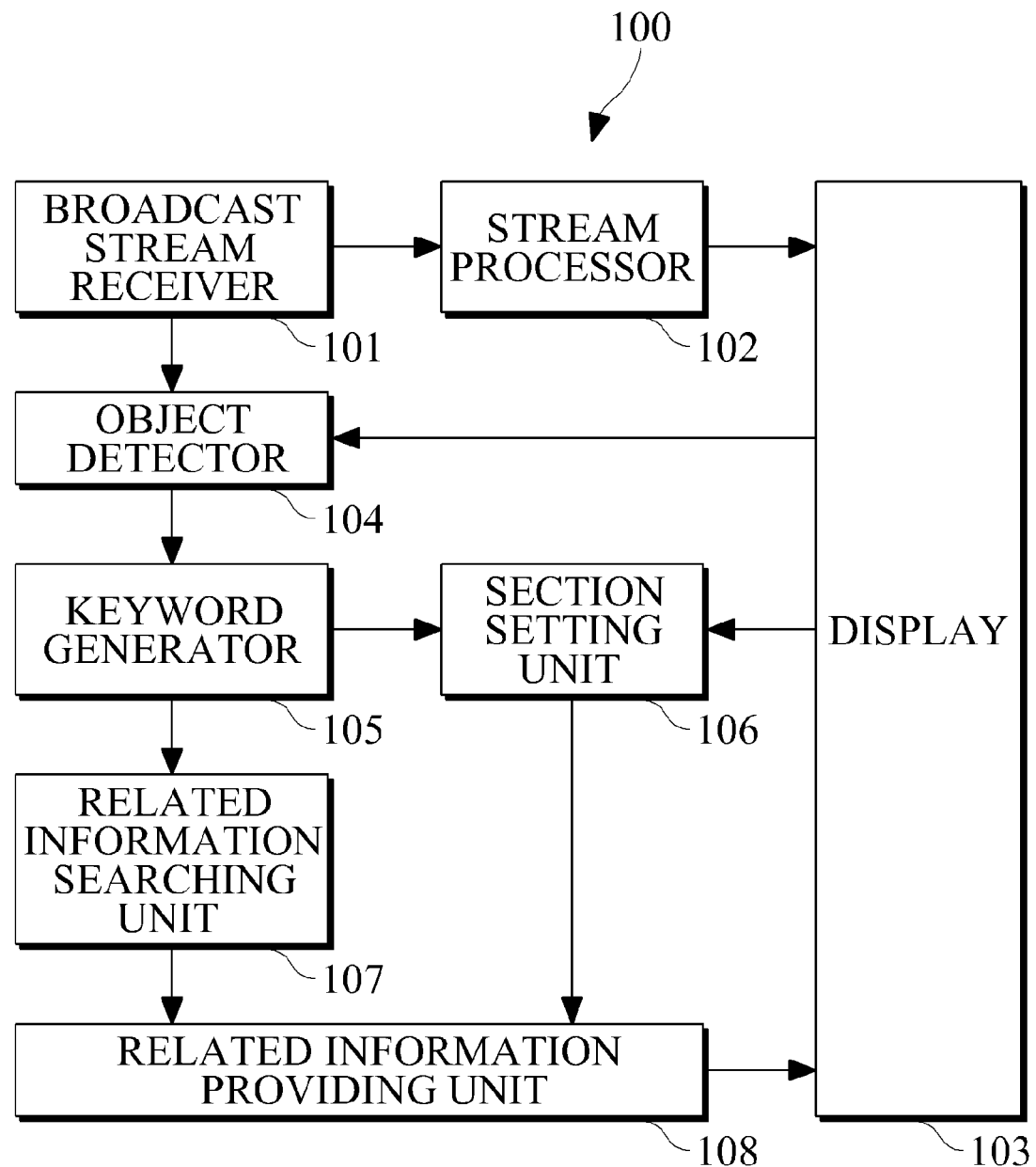
FIG. 1 is a diagram illustrating an example of an apparatus for providing information related to broadcast programs.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

According to an aspect of the invention, an apparatus provides information related to a broadcast program, including: an object detector which detects at least one object from a scene; a keyword generator which generates a keyword including a name and information regarding the meaning of the object; a section setting unit which sets a scene section using the keyword; a related information searching unit which requests searching of related information associated with the object using the keyword and receives the searched related information; and a related information provider which synchronizes the received related information with the scene section and provides the related information synchronized with the scene section.

According to another aspect of the invention, there is provided a method for providing information related to a broadcast program, including: detecting at least one object from a scene; generating a keyword including a name and information regarding the meaning of the object; setting a scene section using the keyword; requesting searching of related information associated with the object using the keyword and receiving the searched related information; and synchronizing the received related information with the scene section and providing the related information synchronized with the scene section.

The keyword may be a word with little or no ambiguity. Ambiguity of an object name may be mostly eliminated by adding category information to an object name. Removal of ambiguity from an object name may be done by adding an appropriate category to the object name with reference to an object name dictionary in which object names are individually mapped to category names, by performing context analysis or by using genre information.

A scene section may be determined based on an amount of preserved keywords between scenes and may be a group of scenes that deal with substantially the same subject.

Other features and aspects will be apparent from the following detailed description, the drawings, and the claims.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of an apparatus 100 for providing information related to broadcast programs.

The broadcast program-related information providing apparatus 100 may be installed in any of various wired/wireless terminals connected to a network, including digital TV, IPTV, a computer, a mobile phone, a smart phone, a set-top box, etc., which are capable of providing users with broadcast programs.

Referring to FIG. 1, broadcasting program-related information providing apparatus 100 includes a broadcast stream receiver 101, a stream processor 102, a display 103, an object detector 104, a keyword generator 105, a section setting unit 106, a related information searching unit 107 and a related information providing unit 108.

Broadcast stream receiver 101 receives broadcast streams. The broadcast streams are broadcast data transmitted from a broadcasting station. The broadcast streams may contain video signals, audio signals, caption signals, Electronic Program Guide (EPG) signals, etc.

Stream processor 102 processes the broadcast streams in order to cause scenes to be displayed on display 103. For example, stream processor 102 may perform various kinds of image processing and sound processing.

Display 103 displays the scenes. Display 103 may be a display such as a LCD monitor or an input/output device such as a touch screen.

Object detector 104 detects objects or object names from the scenes displayed on display 103. The term objects refers to characters, items, regions, etc., that are associated with or appear in the scenes. Detection of an object includes identifying the object and extracting a name of the identified object. For example, object detector 104 may identify objects displayed on a current screen and detect the names of the objects.

Object detector 104 may detect objects using the following methods.

According to an example, object detector 104 extracts character strings (or characters) from captions or television opaque projector (telop) character information of broadcast streams and analyzes the extracted character strings to detect objects. For example, object detector 104 applies morphological analysis and part-of-speech tagging based on natural language processing to the character strings to detect nouns having meaningful information as objects.

According to another example, object detector 104 converts sound of broadcast streams into text and analyzes the text in order to detect objects. For example, object detector 104 converts sound from broadcast streams into text in order to generate character strings (or characters) and analyzes the character strings in order to detect nouns having meaningful information as objects.

According to another example, object detector 104 analyzes pictures of broadcast streams in order to detect objects. For example, object detector 104 may apply a character recognition algorithm to pictures extracted from broadcast streams in order to extract predetermined characters and detect objects from the extracted characters. Alternatively, object detector 104 may apply an object recognition algorithm to the pictures of broadcast streams in order to identify predetermined portions of the pictures and then detect the names of objects corresponding to the identified portions. However, methods in which object detector 104 detects objects are not limited to the above-described examples.

Keyword generator 105 generates keywords corresponding to the objects detected by object detector 104. The keywords include the names and information regarding the meaning of the objects. The information regarding the meaning of the objects is to eliminate any ambiguity of the object names and may be category information for the objects. For example, when an object name "BAT" which may mean both a flying animal "Bat" and sports equipment "Bat" is detected, the keyword generator 105 may assign category information such as "animal" or "sports equipment" to the object name "BAT" in order to eliminate the ambiguity of the object name "BAT," thus generating a keyword "BAT/Animal" or "BAT/Sports equipment".

Keyword generator 105 assigns meaning information to an object name to eliminate ambiguity from the object name in various ways, as follows.

According to an example, keyword generator 105 may assign meaning information to an object name with reference to an object name dictionary. The object name dictionary is a word list in which object names are individually mapped to categories. For example, the object name dictionary may include mapped words such as "BAT-animal" and "BAT-sports equipment." Keyword generator 105 estimates a probability at which an object name belongs to which category and determines a category suitable for the object name based on the estimated probability. The probability at which an object name belongs to which category may be estimated based on a disambiguation model of the natural language processing.

According to another example, keyword generator 105 may analyze the context of an object name in order to assign to the object name appropriate information regarding the meaning of the object. For example, when words "cave" and "night" appear before and/or after an object name "BAT," keyword generator 105 may assign an "animal" category to the object name "BAT," At this time, keyword generator 105 may use machine learning, such as Bayesian, Conditional Random Field, Support Vector Machines, etc., for disambiguation.

According to another example, keyword generator 105 may assign information regarding the meaning of the object name to an object name using genre information. For example, when an object name "BAT" is detected while a program whose program genre is "documentary" is being broadcasted, an "animal" category is assigned to the object name "BAT." On the other hand, if the program genre is "sports", the object name "BAT" is assigned a "sports equipment" category. The genre information may also be acquired in various ways, for example, from Electronic Program Guide (EPG) information of broadcast streams or by analyzing the name of the program. Further, the genre information may be acquired through a third party service from any place other than a broadcasting station. However, a method of determining the genre of a broadcasting program is not limited to these examples, and any other appropriate method may be used.

Then, section setting unit 106 sets a scene section using the keyword generated by keyword generator 105. The scene section means a group of scenes that can be considered to deal with the substantially same subject. Section setting unit 106 may set a scene section based on the amount of preserved keywords between scenes. Here, the amount of preserved keywords may be defined by the number of keywords extracted in common from successive scenes. Section setting unit 106 may set a scene section by determining a group of scenes between which the number of preserved keywords is equal to or greater than a threshold value. In other words, section setting unit 106 may identify scenes that are considered to deal with substantially the same content and determines a group of the scenes as a scene section.

For example, it is assumed that there are 6 keywords in common from among 10 keywords extracted from a first scene and 10 keywords extracted from a second scene. In this situation, the amount of preserved keywords is calculated to be 60% ((2*6)/(10+10)=0.6), and in response to a threshold value being set as 50%, the first and second scenes are determined to be included in a scene section.

Meanwhile, when there are 3 keywords in common from among 10 keywords extracted from a first scene and 15 keywords extracted from a second scene, the amount of preserved keywords is calculated to be 24% ((2*3)/(10+15)=0.24). In this situation, in response to a threshold value being set as 50%, the first and second scenes are not included in a scene section.

However, section setting unit 106 may decide, instead of using the amount of preserved keywords to set a scene section, a time of scene conversion based on scene or based on scene/text to determine scene sections.

Thereafter, related information searching unit 107 requests searching of information related to the objects using the keywords generated by keyword generator 105. For example, related information searching unit 107 may transmit an inquiry generated based on a keyword to a search server and receive the result of searching from the search server. Additionally, related information searching unit 107 may request an advertisement item related to a keyword to a search server. Related information searching unit 107 may collect many kinds of related information from various web sites depending on the category of a keyword. For example, in response to the category of a keyword being a movie title, related information searching unit 107 collects various information about a movie such as theaters, actors, and synopsis from the movie introductory website. In response to the category of a keyword being an animal name, related information searching unit 107 searches wikipedia or cyber encyclopedia. In the current example, the related information may include the results of such searching and advertisement items.

Related information searching unit 107 may generate an extended inquiry by adding additional information to a keyword. For example, related information searching unit 107 may use a keyword including an object name and a category as an inquiry or may generate an extended inquiry by adding a detailed category to a keyword including an object name and a category.

Related information searching unit 107 may also search for related information including an advertisement from its own database, instead of from a separate search server. Furthermore, related information searching unit 107 may receive related information from a third information providing site on the web, instead of from a search sever, in order to provide information (for example, the names of stores, restaurants, etc.) that is not explicitly displayed on the screen of a broadcasting program.

Related information 108 synchronizes the received related information to the corresponding scene section and provides the related information synchronized to the scene section to display 103. The synchronization means matching the received related information to a time at which the corresponding object appears on the screen.

For example, related information providing unit 108 may display representative pictures of scene sections in association with related information corresponding to keywords for the scene sections, on a portion of the display on which a broadcast screen is displayed. In other words, it is possible to show, only while scenes considered to deal with the substantially same subject continue, the corresponding related information, and to stop, when scene conversion to a substantially different subject occurs, displaying the related information.

Additionally, related information providing unit 108 may rank received related information based on a user profile and primarily display highly ranked related information. The user profile may store personal information, such as the user's age and sex distinction, and the user's preference information about broadcast programs.

Figure 2:
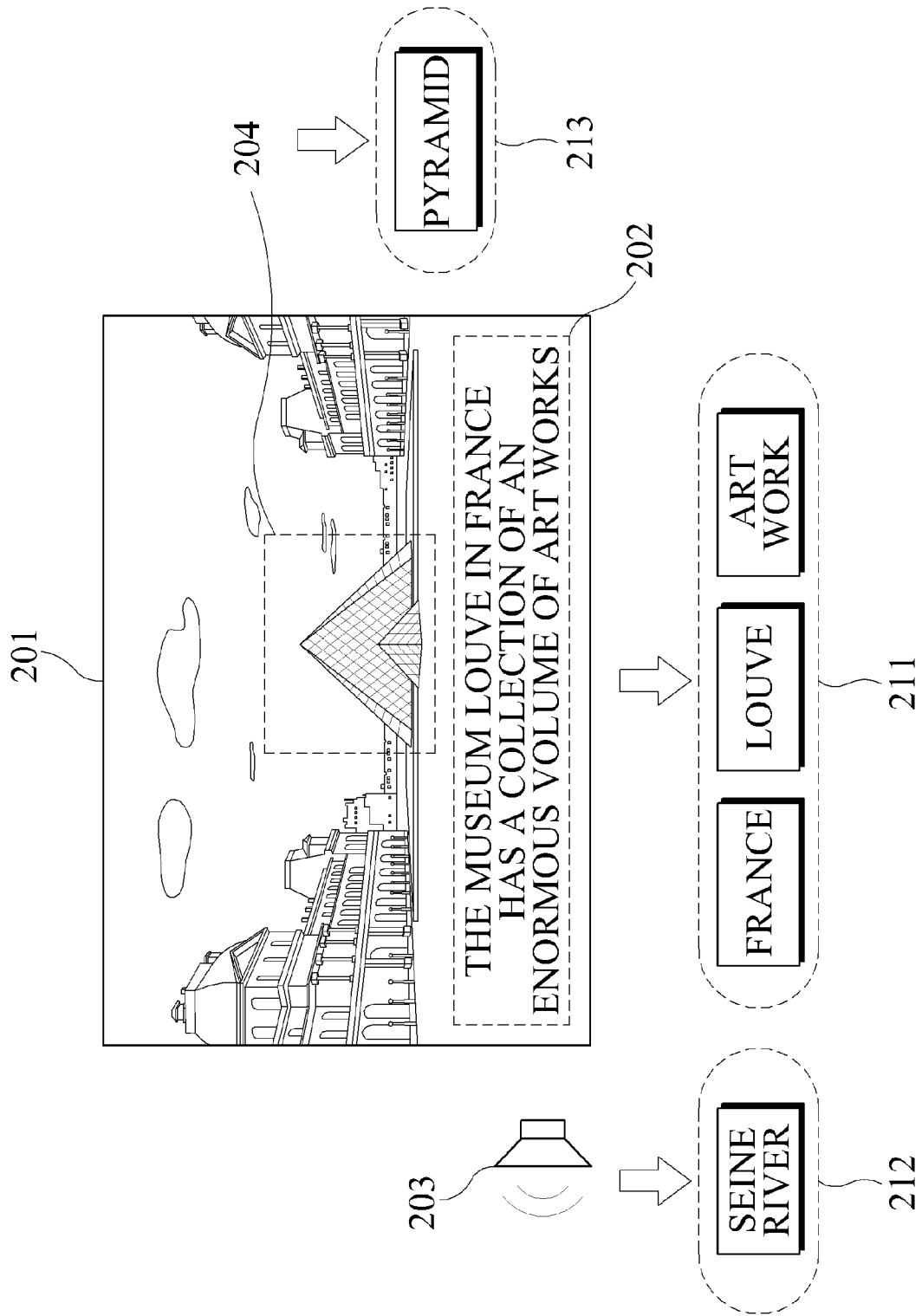
FIG. 2 illustrates examples of objects.

FIG. 2 illustrates examples of objects.

Referring to FIGS. 1 and 2, object detector 104 analyzes a caption 202, a sound 203 and a specific portion on a current screen 201 in order to detect main objects 211, 212 and 213 with which screen 201 is involved with.

In detail, object detector 104 extracts a caption 202 written as "The museum Louvre in France has a collection of an enormous volume of art works" and performs a morpheme analysis and part-of-speech tagging on extracted caption 202 according to a natural language processing algorithm. The morpheme analysis may be a process of segmenting a caption in units of meaning, and the part-of-speech tagging may be a process of tagging part-of-speech information to each meaning unit. Thus, object detector 104 detects objects 211 from caption 202, subjected to the morpheme analysis and part-of-speech tagging. Objects 211 may correspond to nouns having meaningful information. For example, objects "France," "Louvre" and "Art Work" may be detected from caption 202.

Then, object detector 104 may extract a sound 203, for example, a narration, and converts extracted sound 203 into text. The text is analyzed to detect another object 212. For example, an object "Seine River" 212 may be detected from a narration which can be heard to say "I went to the Louvre along the Seine River."

Additionally, object detector 104 may detect another object 213 from a specific portion of screen 201. For example, object detector 104 may detect another object "pyramid" by applying an object recognition algorithm to screen 201.

Figure 3:
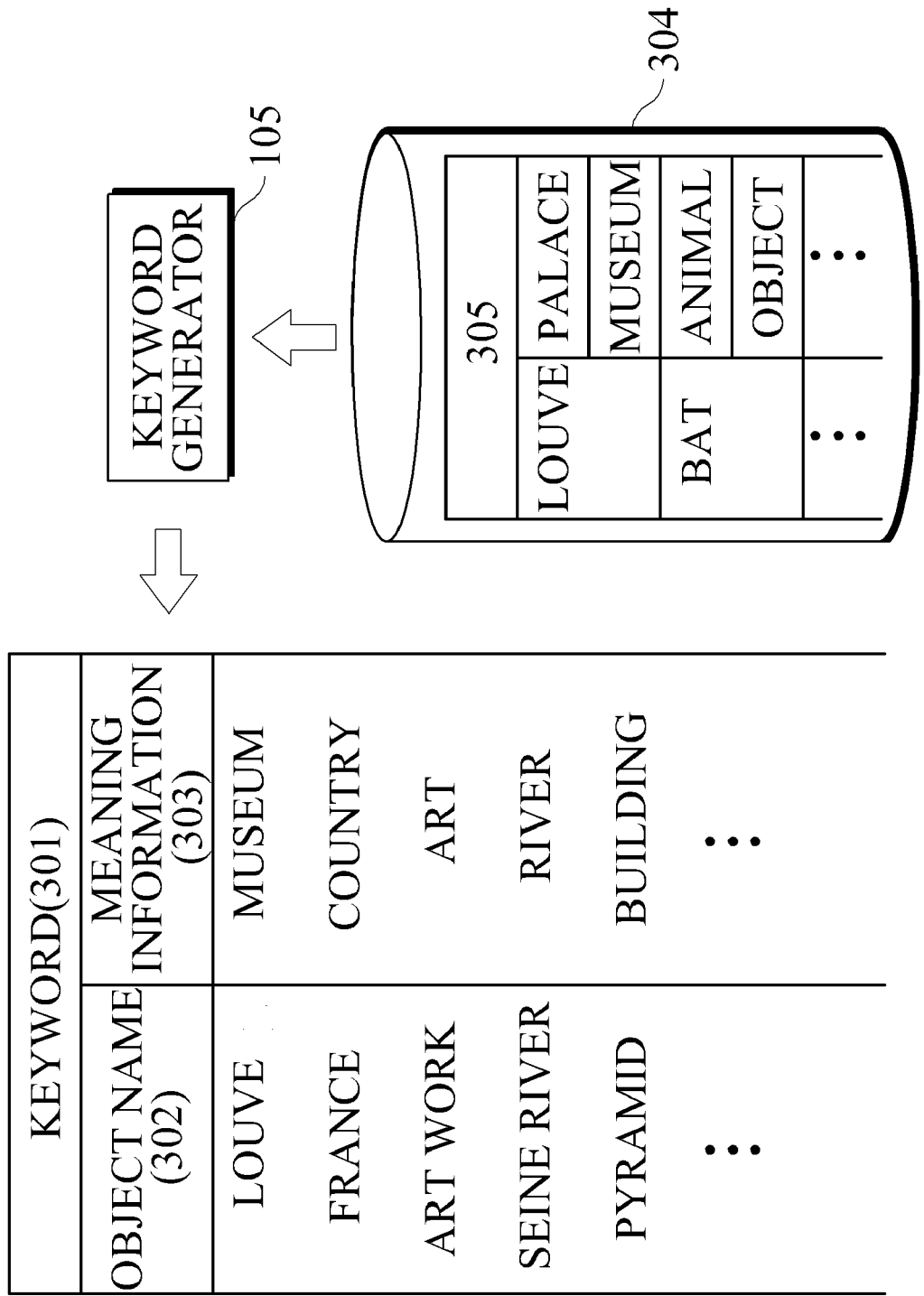
FIG. 3 illustrates an example of a keyword table.

FIG. 3 shows an example of a keyword table 301.

Referring to FIG. 3, keyword table 301 includes object names 302 and meaning information 303. Object names 302 may be representative names indicating objects. The meaning information 303 may be category information to eliminate any ambiguities of the object names. For example, since it is ambiguous which one of the "Louvre Palace" and the "Louvre Museum" indicates the "Louvre," a keyword "Louvre/Museum" may be generated in which a category "Museum" is added as meaning information to the "Louvre."

In the current example, keyword generator 105 may assign information regarding the meaning of an object 303 to object names 302 using an object name dictionary 305 stored in object name database 304. Object name dictionary 305 may be a words list in which object names are individually mapped to categories. Keyword generator 105 analyzes the context of an object name to probabilistically determine to which category in the object name dictionary the object name belongs. The probabilistic determination may depend on Equations 1 below.

$$P_T(w_n \mid w_{M-n}^{n-1}) = \frac{1}{M} \sum_{m=1}^{M} \alpha(w_n \mid w_m) \quad (1)$$

$$\alpha(w_n \mid w_m) = P(w_n, w_m) \log \frac{P(w_n, w_m)}{P(w_n)P(w_m)}$$

In Equations 1, $w_n$ represents a n-th word of an identified character string, $$w_{M-n}^{n-1}$$

represents n−1 words positioned in the left of $w_n$ and M−n words positioned in the right of $w_n$ among M words and $w_m$ represents a m-th word of the M words. Here, M represents the number of words included in the identified character string, n represents where the identified character string is positioned in the M words, P represents a probability with which the corresponding word belongs to which category, and $\alpha$ is the amount of mutual information between two words and represents a probability with which the two words will appear together.

Also, keyword generator 105 may determine a category of the "Louvre" using object name dictionary 305 and context of the word "Louvre." For example, if an object name "Art Work" or "Pyramid" often appears in the context of the word "Louvre," a word "museum" having high relevancy to the "Art Work" or "Pyramid" may be determined as a category of the "Louvre."

Additionally, keyword generator 105 may determine a category based on genre information. The genre information may be acquired from EPG information of broadcast streams, from a third party service received through the web, by analyzing a program name or program content, etc.

Figure 4:
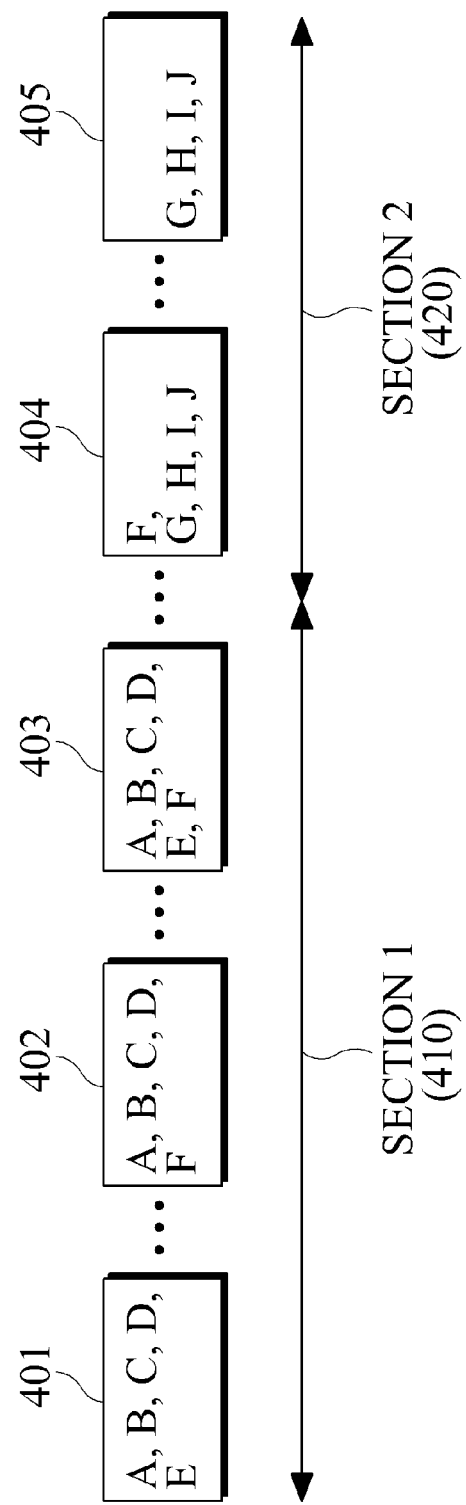
FIG. 4 illustrates examples of scene sections.

FIG. 4 explains an example of scene sections.

In FIG. 4, reference numbers 401 through 405 represent broadcast scenes and letters of each scene represent keywords extracted from the scene.

Referring to FIGS. 1 and 4, section setting unit 106 identifies keywords for each scene. For example, section setting unit 106 identifies keywords A, B, C, D and E from first scene 401 and identifies keywords A, B, C, D and F from second scene 402, following first scene 401.

Then, section setting unit 106 calculates the amount of preserved keywords between scenes 401 through 405. The amount of preserved keywords may be defined by the number of keywords preserved despite scene conversion.

The amount of preserved keywords may be calculated by Equation 2 below.

$$\text{Amount of Preserved Keywords} = \frac{(\text{Number of Scenes})*(\text{Number of Preserved Keywords})}{(\text{Number of Keywords of } (n-1)^{th} \text{ scene}) + \{\text{Number of Keywords of } n^{th} \text{ scene}\}} \quad (2)$$

In Equation 2, 4 keywords A, B, C and D are maintained between first and second scenes 401 and 402 and accordingly the amount of preserved keywords calculated by Equation 2 is 80% (2*4/(5+5)=0.8). Likewise, in third and fourth scenes 403 and 404, only a keyword F is maintained and accordingly the amount of preserved keywords is calculated as about 18.1% (2*1/(6+5)=0.181).

Then, section setting unit 106 compares the calculated amounts of preserved keywords to a threshold value to set scene sections. In response to the threshold value being 50%, first and second scenes 401 and 402 between which the amount of preserved keywords is 80% are set to belong to the same scene section, and third and fourth scenes 403 and 404 between which the amount of preserved keywords is 18.1% are set to belong to different scene sections.

In this manner, section setting unit 106 may set first to third scenes 401, 402 and 403 as a first scene section 410 and set fourth and fifth scenes 404 and 405 as a second scene section 420. That is, section setting unit 106 groups scenes considered to deal with the substantially same subject regardless of the individual displays of scenes.

However, the scene section setting method described above with reference to FIGS. 1 and 4 is exemplary. It is also possible to set scene sections based on the picture statistics of scenes or the text statistics of scenes instead of using the amounts of preserved keywords between scenes.

FIG. 5 illustrates an example of a mapping relation between scene sections and related information 501.

Related information 501 may be various kinds of information related to keywords. For example, related information 501 may include the results of search inquiries generated based on keywords and various advertisement items associated with the keywords. In FIG. 5, related information A may be a group of information associated with a keyword A and may include the results (for example, A1 and A2) of searching and advertisement information (for example, A3).

In the current example, related information 501 is synchronized with scene sections 502. That is, related information for a certain keyword is mapped to a scene section to which the keyword belongs. For example, referring to FIGS. 4 and 5, related information A is synchronized with and provided in a scene section 1 since the corresponding keyword A appears in the scene section 1, and related information F may be synchronized with and provided in the scene sections 1 and 2 since the corresponding keyword F appears in both the scene sections 1 and 2.

Also, when the related information A is related information for a keyword "Louvre/museum," A1 may be information relating to a history of the Louvre Museum; A2 may be information relating to the opening hour of the Louvre Museum and A3 may be an advertisement for a travel product containing a tour of the Louvre Museum. In this situation, related information provider 108 (see FIG. 1) may prioritize the related information A1, A2 and A3 with reference to a user profile and provide them in the order of priority.

Figure 6:
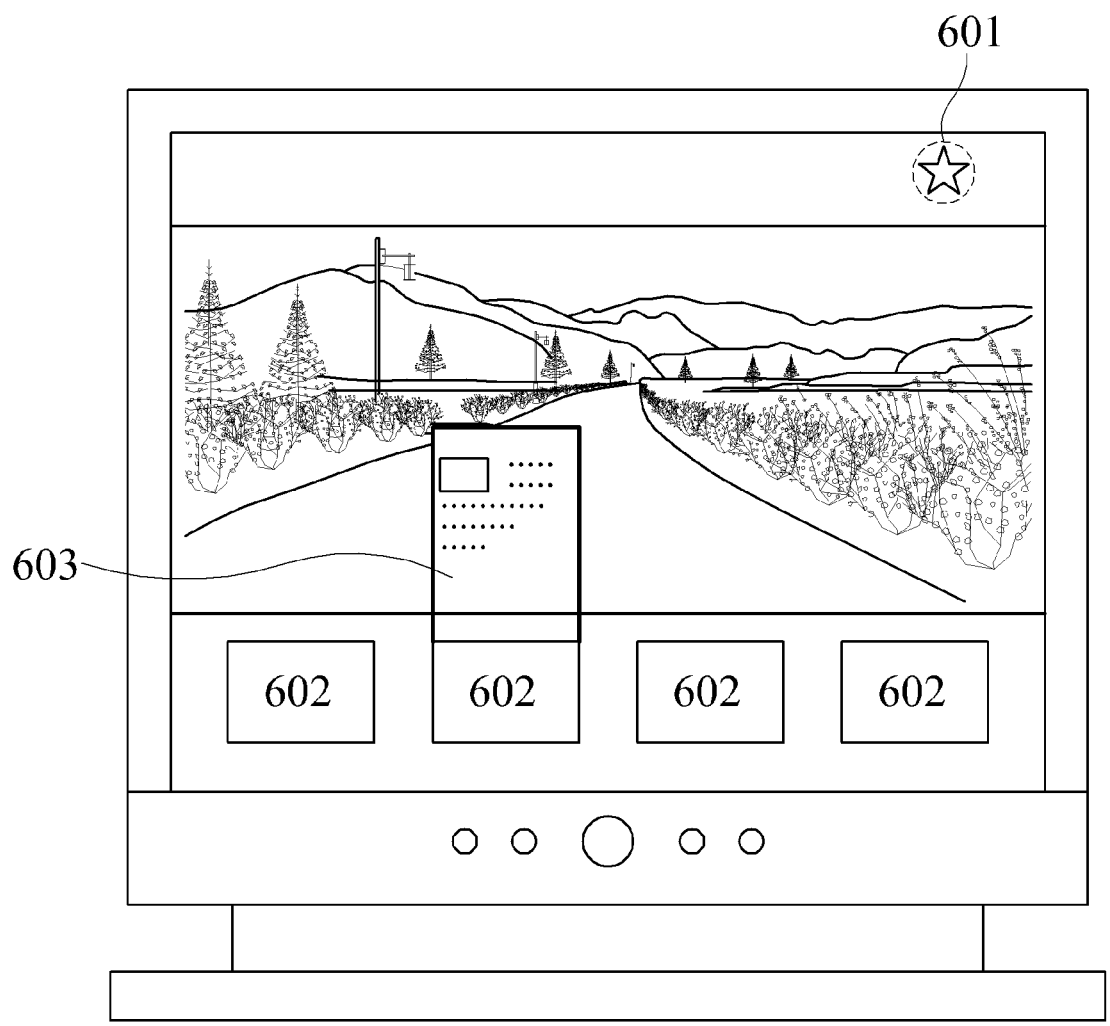
FIG. 6 illustrates an example of a related information display screen.

FIG. 6 illustrates an example of a related information display screen.

Referring to FIG. 6, related information 602 may be synchronized with a scene section corresponding to a screen currently being broadcast and displayed on the lower portion of the screen. Accordingly, in response to a scene section changing due to scene conversion, related information 602 may be accordingly changed to a different scene section.

Also, it is possible for a user to select one piece of related information 602 and display detailed information 603. Additionally, when new related information 602 is created, an icon 601 announcing the creation of new related information, may be displayed on the upper portion of the screen. When icon 601 is displayed, a user may manipulate a remote control to select icon 601 and display related information 602 on the screen.

Figure 7:
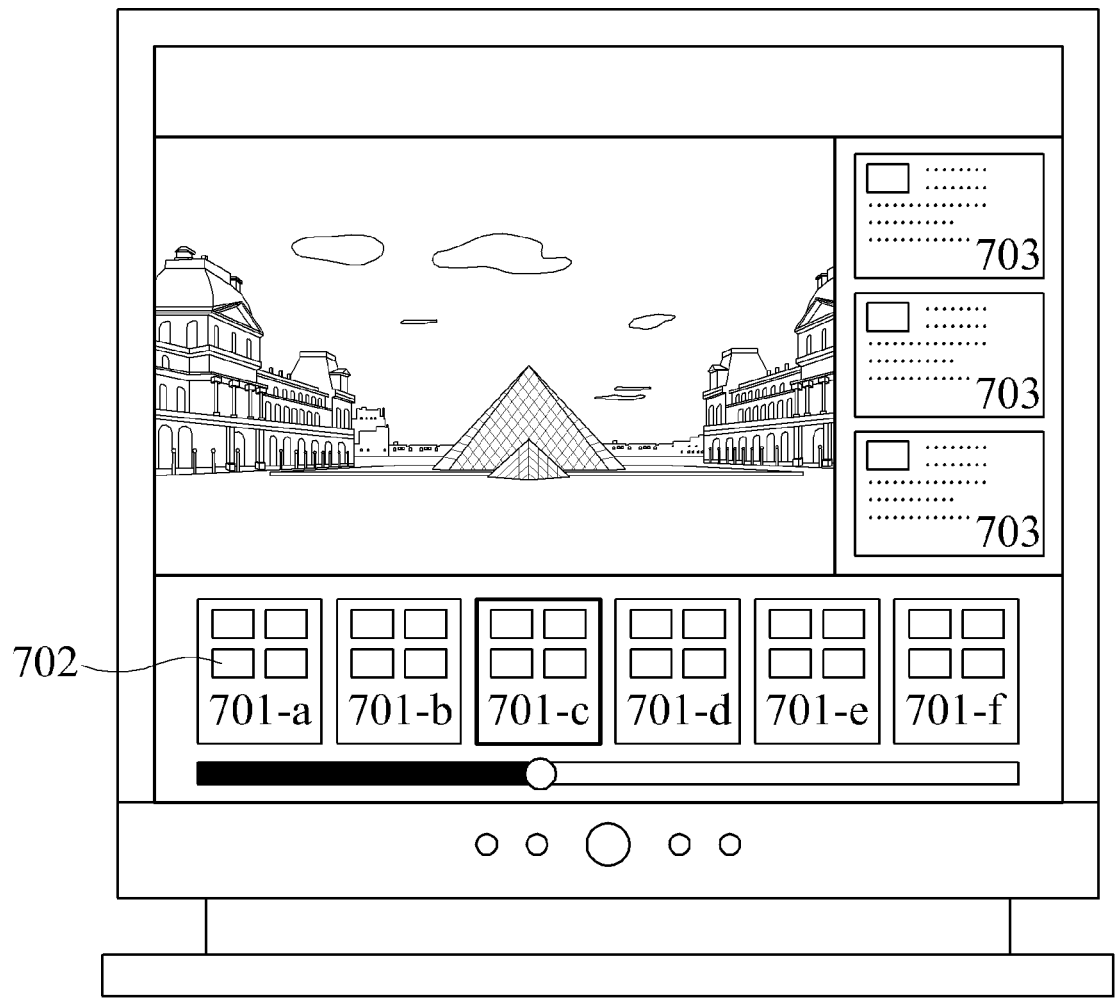
FIG. 7 illustrates another example of a related information display screen.

FIG. 7 illustrates another example of a related information display screen.

Referring to FIG. 7, representative scenes 701-a through 701-f may be displayed on the lower portion of the screen. Each representative scene, for example, scene 701-a, may be a representative frame of a scene section. Representative scene 701-a includes keywords corresponding to the scene section. When a user selects one representative scenes 701-a through 701-f, related information 703 corresponding to the selected representative scene may be displayed on the right portion of the screen. In response to a representative scene being selected, the screen may move to a scene section to which the selected representative scene belongs.

The related information display screens illustrated in FIGS. 6 and 7 are examples for explaining synchronization of related information with scene sections, and the related information may be displayed using any other method. For example, it is possible to display all keywords that have appeared in a program being currently broadcasted and allow a user to select any one of the keywords so as to reproduce the program from a scene section in which the selected keyword has appeared.

Figure 8:
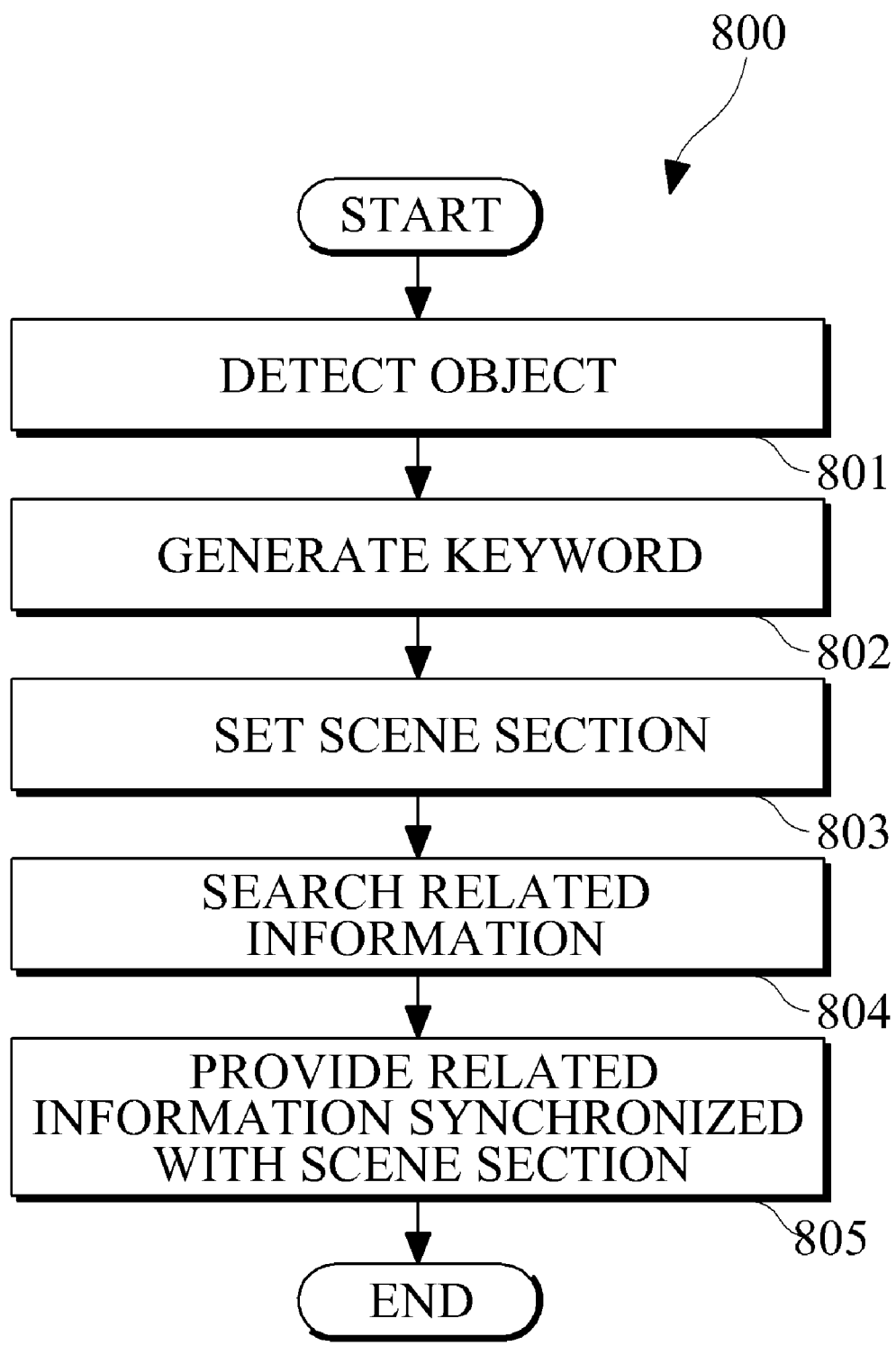
FIG. 8 is a flowchart illustrating one example of a method for providing information related to a broadcast program.

FIG. 8 is a flowchart illustrating an example of a method 800 of providing information related to broadcast programs.

Referring to FIGS. 1 and 8, objects are detected from a scene (801). For example, object detector 104 may identify objects with which a current broadcasting program deals using at least one of video information, sound information, caption information, electronic program guide information, telop character information, etc., and then detect the names of the objects.

Then, keywords including the names and meaning information of the objects are generated (802). For example, keyword generator 105 may determine the name of each object and a category to which the object name belongs in order to eliminate ambiguity of the object name, thus generating a keyword including the object name and the corresponding category. Here, a category of each object may be determined by utilizing an object name dictionary in which a plurality of object names are stored for each category, by analyzing context of a part where the object name appears or by using genre information. The genre information may be acquired from additional information included in broadcast streams, from a third party service that provides genre information through the web or by analyzing the generated keyword.

Then, a scene section is set using the keyword (803). For example, section setting unit 106 may set a scene section using the amount of preserved keywords defined by the number of keywords that appear in common between scenes.

Then, information related to the keyword is searched using the keyword (804). For example, related information searching unit 107 may generate an inquiry based on the keyword, transfers the inquiry to a search server and receive related information including an advertisement associated with the keyword from the search server.

Thereafter, the found related information is synchronized with the scene section and provided to a user (805). For example, related information providing unit 108 may display representative scenes for scene sections in association with received related information on a portion of a screen on which scenes are displayed. Also, related information provider 108 may prioritize the received related information according to a use profile and provide the related information in the order of priorities.

The processes, functions, methods and/or software described above may be recorded, stored, or fixed in one or more non-transient computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, etc. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved in response to the described techniques being performed in a different order and/or in response to components in a described system, architecture, device, or circuit being combined in a different manner and/or replaced or supplemented by other components or their equivalents. Accordingly, other implementations are within the scope of the following claims.

The invention claimed is:

1. An apparatus for providing information related to a broadcast program, the apparatus comprising:
   an object detector that detects at least one object from scenes displayed on a display;
   a keyword generator that generates a keyword including a name and information related to a meaning of the object;
   a section setting unit that sets a scene section comprising a group of the scenes that deal with a same subject between the scenes displayed on the display using the generated keyword based on an amount of preserved keywords that are generated based on the at least one object from the scenes;
   a related information searching unit that requests a searching of related information associated with the object by using the keyword, and receives the searched related information; and
   a related information provider that synchronizes the received related information along with the scene section comprising the group of the scenes that deal with the same subject between the scenes displayed on the display and provides the related information synchronized with the scene section to display,
   wherein the object detector, the keyword generator, the section setting unit, the related information searching unit, the related information provider comprise at least one processor;
   wherein the section setting unit sets as the scene section a group of scenes between which an amount of preserved keywords is equal to or greater than a threshold value, the preserved keywords being defined by a number of keywords that exist in common between keywords generated from a first scene and keywords generated from a second scene, and
   wherein the keyword generator determines an object name which corresponds to the object and a category to which the object name belongs by using an object name dictionary in which a plurality of object names are individually mapped to categories, thereby generating the keyword including the object name and the category.

2. The apparatus of claim 1, wherein the keyword generator determines the category by analyzing a context of a part where the keyword appears.

3. The apparatus of claim 1, wherein the keyword generator determines the category by acquiring genre information relating to the scene.

4. The apparatus of claim 3, wherein the genre information is acquired from additional information included in broadcast streams, from a third party service that provides genre information through the internet or by analyzing the generated keyword.

5. The apparatus of claim 1, wherein the object detector detects the object using at least one of video information, sound information, caption information, Electronic Program Guide information and telop character information, which are included in received broadcast streams.

6. The apparatus of claim 1, further comprising a display which displays the scene and the related information.

7. The apparatus of claim 6, wherein the related information provider controls the display in order to provide the related information to a user.

8. The apparatus of claim 7, wherein the related information provider controls the display in order to display on a portion of the display information regarding the scene section in association with the related information.

9. The apparatus of claim 7, wherein the related information provider prioritizes the related information according to a user profile and provides the related information in an order of priority based on the order of prioritizing the related information.

10. The apparatus of claim 1, wherein the related information provider controls the display in order to prioritize the related information according to a user profile and provide the related information in an order of priority.

11. A method of providing information related to a broadcast program, the method comprising:
- detecting at least one object from a scene by an object detector;
- generating a keyword including a name and information relating to a meaning of the object;
- setting a scene section comprising a group of the scenes that deal with a same subject between the scenes displayed on a display by using the keyword that is generated based on the at least one object from the scenes, the scene section comprising a group of the scenes that deal with a same subject between the scenes displayed on the display;
- requesting searching of related information associated with the object by using the keyword and receiving the searched related information; and
- synchronizing the received related information along with the scene section comprising the group of the scenes that deal with the same subject between the scenes displayed on the display and providing the related information synchronized with the scene section,
- wherein the setting of the scene section comprises setting as the scene section a group of scenes between which an amount of preserved keywords is equal to or greater than a threshold value, the preserved keywords being defined by a number of keywords that exist in common between keywords generated from a first scene and keywords generated from a second scene, and
- wherein the generating of the keyword comprises determining an object name which corresponds to the object and a category to which the object name belongs by using an object name dictionary in which a plurality of object names are individually mapped to categories, thereby generating the keyword including the object name and the category.

12. The method of claim 11, wherein the generating of the keyword comprises determining the category by analyzing context of a part where the keyword appears.

13. The method of claim 11, wherein the generating of the keyword comprises determining the category by acquiring genre information regarding the scene.

14. The method of claim 13, wherein the genre information is acquired from additional information included in broadcast streams, from a third party service that provides genre information through a web or by analyzing the generated keyword.

15. The method of claim 11, wherein the detecting of the object comprises detecting the object using at least one of video information, sound information, caption information, Electronic Program Guide information and telop character information, which are included in received broadcast streams.

16. The method of claim 11, wherein the providing of the related information comprises prioritizing the related information according to a user profile and providing the related information in an order of priority based on the prioritizing of the related information, and displaying the related information on a predetermined display.

17. The method of claim 16, wherein the providing of the related information comprises controlling the predetermined display in order to display information regarding the scene section in association with the related information on a portion of the predetermined display.

* * * * *